(No Model.)
H. C. COLTON.
HARNESS BUCKLE.
No. 298,351. Patented May 13, 1884.
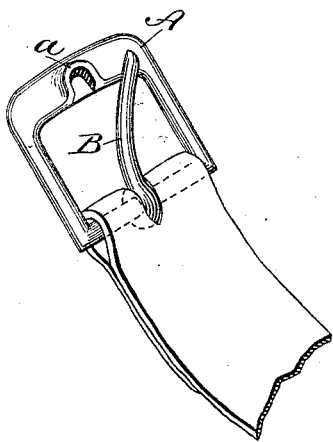
Witnesses:
R. R. Riker
Ira Pierce
Inventor:
Henry C. Colton
per T. J. Deavitt
Attorney.

UNITED STATES PATENT OFFICE.

HENRY C. COLTON, OF MONTPELIER, VERMONT.

HARNESS-BUCKLE.

SPECIFICATION forming part of Letters Patent No. 298,351, dated May 13, 1884.

Application filed February 21, 1884. (No model.)

*To all whom it may concern:*

Be it known that I, HENRY C. COLTON, a citizen of the United States, residing at Montpelier, in the county of Washington and State of Vermont, have invented new and useful Improvements in Harness-Buckles, of which the following is a specification.

My invention relates to harness-buckles.

The object of my invention is to provide a buckle the upper or face side of which is in such form as will prevent the horse's tail from being caught or entangled in the buckle, which is often the case in the buckles in common use, which causes much annoyance, and also causes some horses to kick and commit damage, and to endanger the lives of those riding in the carriage behind them. It is calculated more particularly for the hip and crupper straps, but may be used on any part of the harness and upon saddle equally well, preventing the mane and tail of one horse being caught in the harness of another horse when two or more horses are worked together in a team or congregated in a stable or elsewhere. It acts as a safety-buckle in accidents, preventing injury to horse or person in coming in contact with it.

In the accompanying drawing, which is made a part of this application, A is the frame; B, the tongue; $a$, a raised guard upon the end bar of the frame where the end of the tongue rests. The free end of the tongue is of a shape and form that fits into guard $a$, leaving no projections or roughness to which the hairs of the tail can become attached. The guard $a$ also adds strength to the frame of the buckle.

Having thus described my invention, what I claim, and desire to secure by Letters Patent, is—

An improved harness-buckle having a raised guard upon the frame to protect the end of the buckle-tongue, all substantially as shown and described.

HENRY C. COLTON.

Witnesses:
THOMAS J. DEAVITT,
R. R. RIKER.